United States Patent
Malani et al.

(10) Patent No.: US 12,196,590 B2
(45) Date of Patent: *Jan. 14, 2025

(54) CORIOLIS MASS FLOW SENSORS HAVING DIFFERENT RESONANT FREQUENCIES

(71) Applicant: Malema Engineering Corporation, Boca Raton, FL (US)

(72) Inventors: Deepak Bhagwan Malani, Boca Raton, FL (US); Jayasekar Rajagopalan, Cupertino, CA (US); Claus Waldersdorff Knudsen, Fremont, CA (US); Peter Anthony McCann, Madera, CA (US); Vinh T. Nguyen, San Jose, CA (US)

(73) Assignee: Malema Engineering Corporation, Boca Raton, FL (US)

( * ) Notice: Subject to any disclaimer, the term of this patent is extended or adjusted under 35 U.S.C. 154(b) by 297 days.

This patent is subject to a terminal disclaimer.

(21) Appl. No.: 17/702,554

(22) Filed: Mar. 23, 2022

(65) Prior Publication Data

US 2022/0214200 A1  Jul. 7, 2022

Related U.S. Application Data

(63) Continuation of application No. 16/846,061, filed on Apr. 10, 2020, now Pat. No. 11,300,435.

(51) Int. Cl.
*G01F 1/84* (2006.01)

(52) U.S. Cl.
CPC ................ *G01F 1/8477* (2013.01)

(58) Field of Classification Search
None
See application file for complete search history.

(56) References Cited

U.S. PATENT DOCUMENTS

| 3,803,912 A | 4/1974 | Ohno |
| 4,252,028 A | 2/1981 | Smith et al. |

(Continued)

FOREIGN PATENT DOCUMENTS

| CN | 87107806 A | 6/1988 |
| CN | 1426531 A | 6/2003 |

(Continued)

OTHER PUBLICATIONS

U.S. Appl. No. 17/523,185, Malani et al.

(Continued)

*Primary Examiner* — Brandi N Hopkins
*Assistant Examiner* — Nigel H Plumb
(74) *Attorney, Agent, or Firm* — Fish & Richardson P.C.

(57) ABSTRACT

A flow measurement system includes two or more flow sensors that may operate simultaneously and a plurality of connected flow paths for flow of fluids. Each flow sensor is positioned along a different flow path of the plurality of connected flow paths and includes at least one flow tube and a support that clamps the flow tube. The flow tube of each flow sensor has a different resonant frequency so that cross-talk between the flow sensors can be reduced or eliminated. In some embodiments, the flow tube of each flow sensor has a different tube length, wall thickness, material, and/or weight. The flow measurement system can also include one or more pumps for pumping fluid into the flow sensors and a dampener arranged between a pump and a corresponding flow sensor for mitigating interference on the flow sensor from operation of the pump.

20 Claims, 9 Drawing Sheets

(56) References Cited

U.S. PATENT DOCUMENTS

| | | | |
|---|---|---|---|
| 4,491,025 A | 1/1985 | Smith et al. | |
| 4,768,385 A | 9/1988 | Cage | |
| 4,823,613 A | 4/1989 | Cage et al. | |
| 4,852,409 A * | 8/1989 | Herzl | G01F 1/8431 |
| | | | 73/861.356 |
| 4,934,196 A | 6/1990 | Romano | |
| 5,038,620 A | 8/1991 | Roqers et al. | |
| 5,343,764 A | 9/1994 | Mattar et al. | |
| 5,373,634 A | 12/1994 | Lipp | |
| 5,373,745 A | 12/1994 | Caqe | |
| 6,156,144 A | 12/2000 | Lueghamer | |
| 6,383,423 B1 | 5/2002 | Kurokawa et al. | |
| 6,450,042 B1 | 9/2002 | Lanham et al. | |
| 6,598,488 B1 | 7/2003 | Sutton et al. | |
| 6,662,120 B2 | 12/2003 | Drahm et al. | |
| 6,748,813 B1 | 6/2004 | Barget et al. | |
| 6,776,053 B2 | 8/2004 | Schlosser et al. | |
| 6,802,224 B2 | 10/2004 | Nakao et al. | |
| 6,904,667 B2 | 6/2005 | Lanham et al. | |
| 7,127,815 B2 | 10/2006 | Schlosser et al. | |
| 7,350,421 B2 | 4/2008 | Anklin-lmhof et al. | |
| 7,562,585 B2 | 7/2009 | Schuetze et al. | |
| 7,716,995 B2 | 5/2010 | Patten et al. | |
| 8,404,076 B2 | 3/2013 | Young et al. | |
| 8,887,578 B2 | 11/2014 | Young et al. | |
| 9,435,695 B2 * | 9/2016 | Mansfield | G01F 1/8436 |
| 9,677,921 B2 | 6/2017 | Young | |
| 10,209,113 B2 | 2/2019 | Young et al. | |
| 10,260,922 B2 * | 4/2019 | Young | G01F 1/8409 |
| 11,300,435 B2 * | 4/2022 | Malani | G01F 1/8413 |
| 2002/0139199 A1 | 10/2002 | Lanham et al. | |
| 2003/0097882 A1 | 5/2003 | Schlosser et al. | |
| 2003/0191598 A1 | 10/2003 | Normen | |
| 2005/0103122 A1 | 5/2005 | Dille | |
| 2005/0252307 A1 | 11/2005 | Andresen et al. | |
| 2006/0048897 A1 | 3/2006 | Temple | |
| 2006/0201260 A1 | 9/2006 | Drahm et al. | |
| 2007/0234824 A1 | 10/2007 | Bitto et al. | |
| 2009/0075129 A1 | 3/2009 | Sparks et al. | |
| 2010/0251830 A1 | 10/2010 | Bitto et al. | |
| 2010/0331644 A1 | 12/2010 | Neale et al. | |
| 2011/0000315 A1 | 1/2011 | Tsubota et al. | |
| 2011/0167910 A1 | 7/2011 | Storm et al. | |
| 2011/0197650 A1 | 8/2011 | Young et al. | |
| 2013/0042700 A1 | 2/2013 | Wang et al. | |
| 2013/0086986 A1 | 4/2013 | Lanham et al. | |
| 2013/0174670 A1 | 7/2013 | Young et al. | |
| 2014/0060161 A1 | 3/2014 | Schick et al. | |
| 2014/0174561 A1 | 6/2014 | Hagihara et al. | |
| 2014/0188421 A1 | 7/2014 | Fraser et al. | |
| 2015/0053021 A1 | 2/2015 | Young | |
| 2015/0268082 A1 | 9/2015 | Kirst et al. | |
| 2015/0300861 A1 | 10/2015 | Regen et al. | |
| 2015/0377673 A1 | 12/2015 | Seeley et al. | |
| 2017/0146380 A1 | 5/2017 | Young et al. | |
| 2018/0179486 A1 | 6/2018 | Fadell et al. | |
| 2019/0279888 A1 | 9/2019 | Gopalakrishnan et al. | |
| 2020/0116612 A1 | 4/2020 | Ruetten et al. | |
| 2020/0249071 A1 | 8/2020 | Cunningham et al. | |
| 2020/0319006 A1 | 10/2020 | Malani et al. | |
| 2021/0164826 A1 | 6/2021 | McAnally et al. | |
| 2022/0236092 A1 | 7/2022 | Malani et al. | |
| 2023/0243684 A1 | 8/2023 | Malani et al. | |

FOREIGN PATENT DOCUMENTS

| | | |
|---|---|---|
| CN | 1882800 A | 12/2006 |
| CN | 102782463 A | 11/2012 |
| CN | 206989514 U | 2/2018 |
| DE | 102019134605 A1 | 6/2021 |
| EP | 0190810 A1 | 8/1986 |
| EP | 0258827 A1 | 3/1988 |
| JP | S6318219 A | 1/1988 |
| JP | H08052805 A | 2/1996 |
| JP | H09501493 A | 2/1997 |
| JP | H09057856 A | 3/1997 |
| JP | 2003525437 A | 8/2003 |
| JP | 2005510701 A | 4/2005 |
| JP | 2005510703 A | 4/2005 |
| JP | 2011058950 A | 3/2011 |
| JP | 2012025008 A | 2/2012 |
| JP | 2013519878 A | 5/2013 |
| KR | 10-1609734 B1 | 4/2016 |
| TW | 201518692 A | 5/2015 |
| WO | WO 2017190823 A1 | 11/2017 |

OTHER PUBLICATIONS

Extended European Search Report in European Appln. No. 23167175.1, dated Sep. 27, 2023, 11 pages.

Extended European Search Report in European Patent Application No. 14838532.1, dated Sep. 7, 2016, 9 pages.

Extended European Search Report in European Patent Application No. 21735838.1, dated Mar. 29, 2022, 9 pages.

First Office Action in Chinese Patent Application No. 201080063688.8, dated Apr. 4, 2014, 6 pages.

First Office Action in Chinese Patent Application No. 20140046308.8, dated Nov. 25, 2016, 22 pages.

International Search Report and Written Opinion in International Application No. PCT/US16/63398, mailed on Feb. 15, 2017, 14 pages.

International Search Report and Written Opinion in International Application No. PCT/US20/26258, mailed on Jun. 29, 2020, 17 pages.

International Search Report and Written Opinion in International Application No. PCT/US2014/051861, mailed on Dec. 22, 2014, 10 pages.

International Search Report and Written Opinion in International Appln. No. PCT/US2021/22497, mailed on Jun. 3, 2021, 11 pages.

JP Office Action in Japanese Patent Application No. 2016-536409, Sep. 26, 2017, 5 pages.

Kim et al., "Effective gamma-ray sterilization and characterization of conductive polypyrrole biomaterials," Nature, Feb. 27, 2018, 10 pages.

KR Office Action in Korean Patent Application No. 10-2012-7023722, dated Jan. 15, 2014, 10 pages.

Materials MDPI—On the potential of bulk metallic glasses for dental implantology: by Alethea liens et al. (Year: 2018).

Second Office Action in Chinese Patent Application No. 20140046308.8, dated Aug. 11, 2017, 8 pages.

The engineering toolbox—metals and alloys—Bulk modulus elasticity www.engineeringtoolbox.com (Year: 2008).

TW Office Action in Taiwanese Application No. 105138710, Aug. 2, 2017, 10 pages.

TW Office Action in Taiwanese Application No. 105138710, May 17, 2018, 10 pages.

TW Office Action in Taiwanese Patent Application No. 103129070, Jun. 10, 2015, 6 pages.

U.S. Office Action in U.S. Appl. No. 14/464,089, dated Feb. 26, 2016, 7 pages.

U.S. Office Action in U.S. Appl. No. 14/464,089, dated Sep. 9, 2016, 8 pages.

Office Action in Korean Appln. No. 10-2023-0046747, mailed on May 27, 2024, 2 pages (with English translation).

* cited by examiner

CORIOLIS MASS FLOW SENSORS HAVING DIFFERENT RESONANT FREQUENCIES

CROSS-REFERENCE TO RELATED APPLICATION(S)

This application is a continuation of U.S. patent application Ser. No. 16/846,061, "Coriolis Mass Flow Sensors Having Different Resonant Frequencies," filed Apr. 10, 2020. The subject matter of all of the foregoing is incorporated herein by reference in its entirety.

BACKGROUND

Field of the Disclosure

The present disclosure generally relates to Coriolis mass flow sensors (also referred to as "flow sensors" or "flow cells"), and specifically to flow sensors that have different resonant frequencies.

Description of the Related Arts

A flow process system, e.g., a process skid, usually includes a number of similar or even identical flow sensors. Cross-talk is a phenomenon where two or more flow sensors having identical operating resonant frequencies which will cause harmonic interference with each other. The cross-talk can include electrical cross-talk, mechanical cross-talk, and/or fluid pulsation based cross-talk. The cross-talk can cause inaccurate measurement by the flow sensors. A flow process system can also include pumps. Operation of the pumps can interfere with vibration within the flow sensors, which also causes inaccurate measurement by the flow sensors.

Conventionally, heavy enclosures are used in flow sensors to mitigate cross-talk and pump interference. These enclosures are usually made from metal, e.g., stainless steel. However, metal enclosures can be expensive and are not suitable for single use/disposable applications. Also, sterilization of flow sensors having metal enclosures is typically done by using chemicals, which is not effective and can cause malfunction of the flow sensors. Thus, improved technologies for mitigating cross-talk and pump interference are needed.

SUMMARY

Embodiments relate to a flow measurement system including a plurality of flow sensors and a plurality of connected flow paths for flow of fluids. The flow sensors can operate simultaneously to measure flow rates and/or densities of different fluids. Each flow sensor is positioned along at least one of the connected flow paths. Each flow sensor includes one or more flow tubes and a support clamping the flow tubes. The support can be cast around the flow tubes or formed around the flow tubes through over-molding. The flow tubes of different flow sensors have different resonant frequencies as a result of a difference in their tube lengths, materials, wall thicknesses, weights, other parameters relating to resonant frequency, or some combination thereof. Thus, cross-talk between the flow sensors can be reduced or eliminated, even without the use of metal enclosures. In some embodiments, each flow sensor includes a plastic enclosure and can be sterilized by using Gamma irradiation.

The flow measurement system can also include at least one pump that pumps a fluid into one or more of the flow sensors. The pump may operate at a frequency that is similar to or same as the resonant frequency of the flow sensor and, therefore, interfere with the operation of the flow sensor. To mitigate this interference, a dampener is positioned between the pump and the flow sensor. The fluid flows through the dampener before it enters the flow sensor. The dampener mitigates vibration of the fluid caused by the pump.

In some embodiments, each flow sensor includes a plastic enclosure and can be sterilized by using Gamma irradiation.

BRIEF DESCRIPTION OF THE DRAWINGS

The teachings of the embodiments can be readily understood by considering the following detailed description in conjunction with the accompanying drawings.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments relate to a flow measurement system including a plurality of flow sensors, at least one pump, and at least one dampener that are positioned along connected flow paths. Each flow sensor includes at least one flow tube, a support clamping the flow tube, and a plastic enclosure. The flow tube of each flow sensor has a different resonant frequency, so that cross-talk among the flow sensors can be reduced or even eliminated. The flow sensor can be calibrated during manufacturing and calibration factors generated during the calibration can be stored in a memory chip of the flow sensor for adjusting flow measurements by the flow sensor during operation. The flow sensor can be sterilized, e.g., by using Gamma irradiation, after the calibration. Further calibration or sterilization by a user of the flow meter may not be required. Each dampener can be installed between a pump and one of the flow sensors to mitigate interference from the operation of the pump on the operation of the flow sensor.

Figure 1:
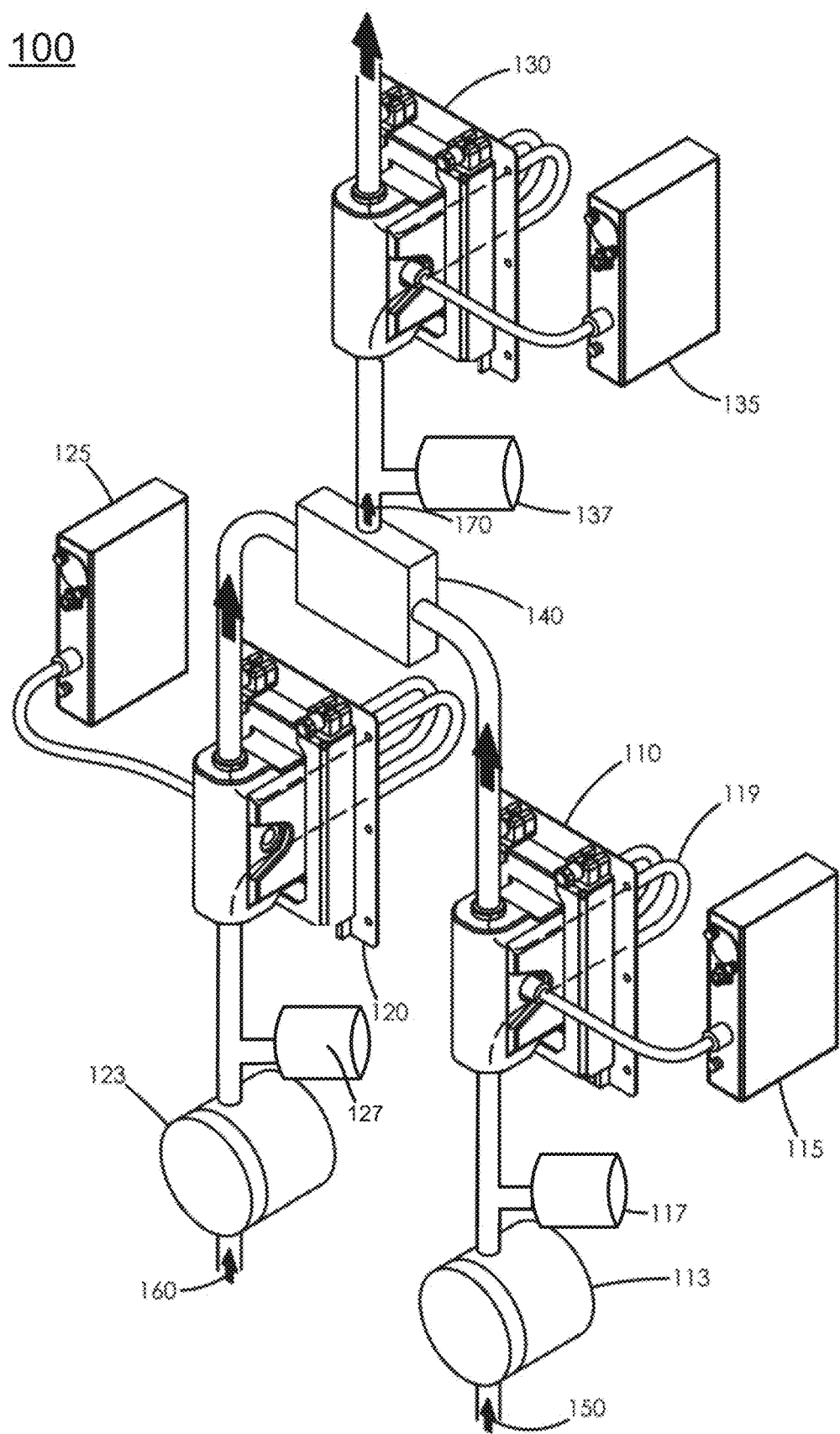
FIG. 1 is a diagram illustrating a flow measurement system containing a plurality of flow sensors, in accordance with an embodiment.

FIG. 1 is a diagram illustrating a flow measurement system 100 containing a plurality of flow sensors 110, 120, and 130, in accordance with an embodiment. The flow measurement system 100 also includes two pumps 113 and 123, three controllers 115, 125, and 135, three dampeners 117, 127, and 137, and a mixing manifold 140. In other embodiments, the flow measurement system 100 may include additional, fewer, or different components. For instance, the flow measurement system 100 can include more flow sensors, pumps, or dampeners. The flow measurement system 100 can be a part of a process skid, e.g., a biopharmaceutical or pharmaceutical skid.

A first fluid 150 and a second fluid 160 enter the flow measurement system 100. The flow measurement system includes connected flow paths for flow of the first fluid 150 and the second fluid 160. The first fluid enters the pump 113, which pumps the first fluid 150 into the dampener 117, and then flows from the dampener 117 to the flow sensor 110. The second fluid 160 enters the pump 123, which pumps the second fluid 160 into the dampener 127, and then flows from the dampener 127 to the flow sensor 120. The flow sensor 110 measures flow characteristics (e.g., mass flow rate, volumetric flow rate, flow density, etc.) of the first fluid 150, the flow sensor 120 measures flow characteristics of the second fluid 160.

The flow path of the first fluid 150 (also referred to as "first flow path") and the flow path of the second fluid 160 (also referred to as "second flow path") are connected at the mixing manifold 140, where a third fluid 170 is generated and a third flow path starts. The third fluid 170 can be a mixture or blend of the first fluid 150 and the second fluid 160. In some embodiments, the mixing manifold 140 includes another fluid or matter that can be mixed or react with the first fluid 150 and the second fluid 160 to generate the third fluid 170. The mixing manifold 140 may include a pump that pumps the third fluid 170 to the dampener 137. The third fluid flows from the dampener 137 to the flow sensor 130. The flow sensor 130 measures flow characteristics of a third fluid 170.

The flow sensors 110, 120, and 130 can operate simultaneously. Each flow sensor includes a pair of flow tubes having different characteristics (e.g., different tube length, different wall thickness, different material, different weight, or some combination thereof) from the flow tubes of the other flow sensors and, thereby, has a different resonant frequency. Due to the different resonant frequencies, crosstalk between the flow sensors 110, 120, and 130 can be reduced or even eliminated. As one example, the flow tubes of each flow sensor may be made of a different material. Examples of the material includes stainless steel, Polyetheretherketone (PEEK), Perfluoroalkoxy alkanes (PFAs), Polyvinylidene difluoride (PVDF), Polytetrafluoroethylene (PTFE), and Fluorinated ethylene propylene (FEP). Other than the differential resonant frequencies, the flow sensors 110, 120, and 130 may be similar to or same as each other.

In some embodiments, at least two of the flow sensors 110, 120, and 130 can have an identical flow rate range. A flow rate range of a flow sensor is a range of flow rates that the flow sensor measures. The flow rate range can depend on the inner diameter of one or more flow tubes of the flow sensor. For instance, when the inner diameter of the flow tube is in the range from 0.1 mm to 0.3 mm, the flow rate range of the flow sensor is 0.05 g/min to 5 g/min. When the inner diameter of the flow tube is in the range from 0.3 mm to 0.9 mm, the flow rate range of the flow sensor is 0.25 g/min to 50 g/min. When the inner diameter of the flow tube is in the range from 5.5 mm to 6.5 mm, the flow rate range of the flow sensor is 15 g/min to 3 kg/min. When the inner diameter of the flow tube is in the range from 7.8 mm to 12.5 mm, the flow rate range of the flow sensor is 90 g/min to 20 kg/min. When the inner diameter of the flow tube is in the range from 15 mm to 60 mm, the flow rate range of the flow sensor is 1 kg/min to 250 kg/min.

Taking the flow sensor 110 for example, the flow sensor 110 includes two flow tubes 119 that provide a flow path of the first fluid 150 in the flow sensor 110. The flow tubes 119 can vibrate, e.g., as driven by magnets and coils. As the first fluid 150 flow through the flow tubes 119, Coriolis forces produce a twisting vibration of the flow tubes 119, resulting in a phase shift of the flow tubes 119. Also, the first fluid 150 changes the resonant frequency of the flow tubes 119. The flow sensor 110 generates signals, e.g., electrical signals, that represent the phase shift and/or change in its resonant frequency. The signals are sent to the controller 115 through an interface connector on the flow sensor 110.

In some embodiments, the flow sensor 110 also includes a memory chip (not shown in FIG. 1) that stores calibration information that can be used to adjust flow measurements made by the flow sensor 100. For instance, the calibration information can include one or more flow rate calibration factors. Each flow rate calibration factor indicates a difference between a flow rate measured by the flow sensor 110 and a reference flow rate and can be used to adjust flow rates measured by the flow sensor 110. The calibration information can also include one or more flow density calibration factors. Each flow density calibration factor indicates a difference between a flow density measured by the flow sensor 110 and a reference flow density and can be used to adjust flow densities measured by the flow sensor 110. The calibration information can be determined during manufacturing.

The flow sensor 110 can include a temperature probe (not shown in FIG. 1) that measures temperatures of the first fluid 150. The measured temperatures can be used to adjust flow rates and/or densities measured by the flow sensor 100.

In the embodiment of FIG. 1, the flow sensors 110, 120, and 130 include U-shaped flow tubes. Flow sensors in other embodiments can include flow tubes of other forms, such as V-shaped. More details about flow sensors are described below in conjunction with FIGS. 2-8.

The controller 115 receives signals from the flow sensor 110 and conducts flow analysis based on the signals. The flow analysis includes, for example, determination of flow rate based on signals representing phase shift of the flow tubes 119, determination of flow density based on signals representing change in resonant frequency of the flow tubes 119, detection of bubbles in the first fluid 150 based on change in flow density, determination of other flow characteristics of the first fluid 150, or some combination thereof.

The controller 115 can read out the calibration information from the memory chip of the flow sensor 110 and use the calibration information in its flow analysis. For example, the controller uses a flow rate calibration factor to determine a flow rate of the fluid or uses a flow density calibration factor to determine a density of the fluid. The controller 115 can also receive temperature information from the temperature probe and use the temperature information to dynamically adjust the flow analysis. For instance, the controller can input the temperature information into a model and the model can output adjusted flow rate and/or flow density.

In some embodiments, the controller is a flow transmitter. In FIG. 1, each flow sensor is connected to a respective controller for flow analysis. The flow sensor 110, cradle (usually made of stainless steel) of the flow sensor, and the controller 115 together can be referred to as a flow meter or a flow meter system.

In some embodiments, the pumps 113 and 123 are identical and the dampener 117 and 127 are identical. Taking the pump 113 as an example, it can be a diaphragm based pulsating pump (such as Quattroflow Model SU-1200 Pump, SU-4400 Pump, SU-150 Pump, SU-30 Pump and SU-5050 Pump, etc), a peristaltic pump, or other types of pumps. The flow sensor 110 measures flow characteristics based on vibration caused by the fluid flowing through the flow sensor. However, the pump 113 can operate at a frequency that is similar to or same as the resonant frequency of the flow sensor 110 and cause the first fluid 150 to vibrate or pulsate. This can degrade operation of the flow sensor 110, such as inaccurate measurement, erratic report, etc. The pulsating operation of the pump 113 may also degrade operation of the flow sensors 120 and 130, which is referred to destructive harmonic interference.

The dampener 117 mitigates the destructive harmonic interference from the pump 113 on the flow sensor 110. As the first fluid 150 flows though the dampener 117, the vibration of the first fluid 150 at the frequency of the pump 113 can be reduced or even eliminated.

Figure 2:
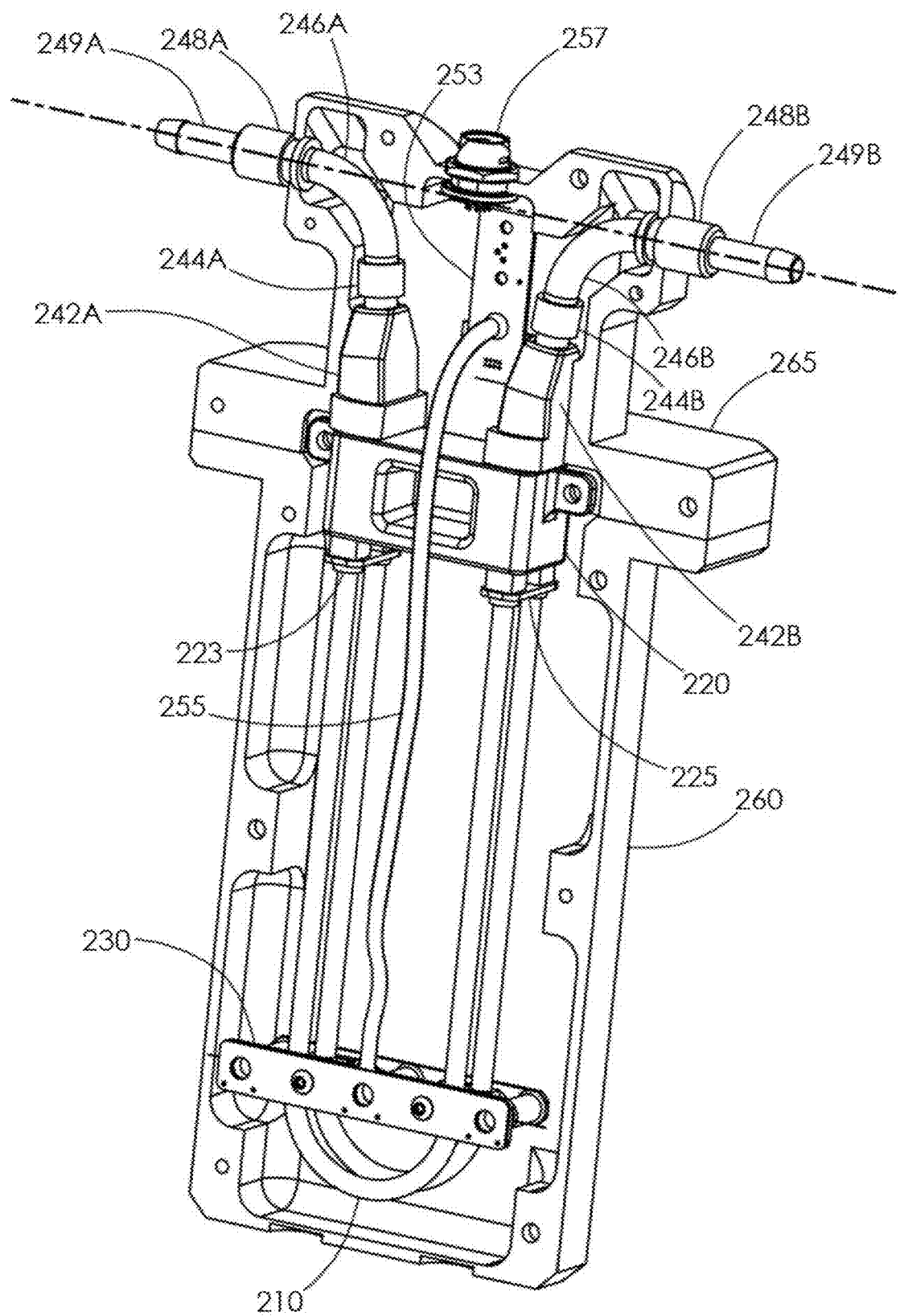
FIG. 2 is a perspective view of a flow sensor including U-shaped flow tubes, in accordance with an embodiment.

FIG. 2 is a perspective view of a flow sensor 200 including U-shaped flow tubes 210, in accordance with an embodiment. The flow sensor 200 can be an embodiment of one of the flow sensors 110, 120, and 130 in FIG. 1. In addition to the flow tubes 210 (individually referred as "flow tube 210"), the flow sensor 200 also includes a support 220 for the flow tubes, an electromagnetic assembly 230, two flow path assemblies, an electronic assembly, and an enclosure assembly. The flow sensor 200 may include additional, fewer, or different components. For example, the flow sensor 200 may include a temperature assembly for measuring temperatures of the fluid or other sensor for measuring other properties of the fluid. FIG. 1 shows two flow tubes 210, but the flow sensor 200 may have one flow tube 210 or more than two flow tubes 210.

The flow tubes 210 allow the fluid to flow through them. The flow tubes 210 vibrate as driven by the electromagnetic assembly 230, and their vibration can be changed by the flow of the fluid. For instance, the flow tubes 210 can twist, which results in a phase shift. Also, the vibration resonant frequency can change. The mass flow rate of the fluid can be directly determined based on the phase shift. The density of the fluid can be directly determined based on the change in vibration resonant frequency. More details regarding the vibration of the flow tubes 210 and the determination of the flow rate and density are described below in conjunction with the electromagnetic assembly 230.

As shown in FIG. 2, each flow tube 210 is a U-shaped tube having two parallel tubular legs. The fluid flows into one of the tubular legs (referred as "inlet tubular leg") and flows out from the other tubular leg (referred as "outlet tubular leg"). The flow tube 210 can have a curvilinear shape. One advantage of such a curvilinear shape is that there are no corners so there are no abrupt changes in direction along the flow path of the fluid. Accordingly, possible accumulation of solids or any other contaminants inside the flow tubes 210 that may cause increased pressure drop or cause the flow tubes 210 to dislodge from the support 220, which can result in particle contamination, is eliminated. In some other embodiments, the flow tube 210 can be in other shapes, such as V-shape, square, rectangular, triangular, elliptic, or straight.

Each flow tube 210 has a thin wall that is less than 1 mm thick, e.g., 0.05 mm to 0.60 mm thick. In some embodiments, the thickness of the wall is 5% to 16% of the outer diameter of the flow tube 210. The outer diameter of the flow tube 210 can be in a range from 0.2 mm to 60 mm. With such a thin wall, the flow tube 210 has good accuracy even at low fluid flow rates, such as 0.05-0.5 gm/min of mass flow rate or 0.05-0.5 ml/min of volumetric flow rate.

In the embodiment of FIG. 2, the two flow tubes 210 are identical, i.e., they have identical shape and dimensions. In some other embodiments, the two flow tubes 210 can be different. The flow tubes 210 may be made of metal (such as stainless steel) or a polymer material (such as Polyetheretherketone (PEEK), Perfluoroalkoxy polymers (PFAs), polyvinylidene difluoride (PVDF), Polytetrafluoroethylene (PTFE), and Fluorinated ethylene propylene (FEP)).

The support 220 provides structural support for the flow tubes 210. The support 220 may be fabricated by casting around the tubular legs of the flow tubes 210 or formed around the tubular legs of the flow tubes 210 through over-molding. The support 220 includes tubular channels through which the flow tubes 210 extend. The support 220 clamps the outer surface of the two tubular legs of each of the flow tubes 210 to hold the flow tubes 210. Compared with other fabrication methods (e.g., injection molding), pressure exerted on the flow tubes 210 and temperature of the flow tubes 210 during the casting process is low so that deformation of the flow tubes 210 can be avoided. More details regarding the casting are described below in conjunction with FIGS. 2-5.

The support 220 is a single integral piece. It may include integrated features such as one or more port extensions 223 (individually referred as "port extension 223") and isolation plates 225 (individually referred as "isolation plate 225") to secure stability of the flow tubes 210. The port extensions 223 clamp the tubular legs of the flow tubes 210. An inner surface of each port extension 223 contacts the outer surface of the corresponding tubular leg. The isolation plates 225 connect adjacent port extensions 223. The isolation plates 225 can establish the boundary conditions of vibration of the flow tubes 210 and maintain stability of the flow tubes 210. The flow tubes 210 can vibrate in opposite phases (referred as "anti-phase vibration") similar to a tuning fork and vibrate together in unison (referred as "in-phase vibration"). The natural frequencies of the anti-phase vibration and in-phase vibration can be close or even identical, resulting in vibrational excitation energy shared uncontrollably between the two vibrational modes, which causes instability of the flow tubes 210. The vibrational boundary conditions created by the isolation plates 225 can separate the natural frequencies of the anti-phase vibration and in-phase vibration to prevent instability of the flow sensor 200. The dimensions and thickness of the isolation plates 225 can be determined based on the frequency response characteristics of the flow tubes 210. In some embodiments, the isolation plates 225 are integrated with the port extensions 223, both of which are integrated with the support 220.

The electromagnetic assembly 230 drives vibration of the flow tubes 210. The electromagnetic assembly 230 includes three magnets, three coils, and two racks. The magnets are mounted on one of the two racks, which is attached on one of the flow tubes 210. The coils are mounted to the other rack, which is attached on the other flow tube 210. One of the three coils, e.g., the coil in the middle, can receive an alternating current, e.g., from a controller (e.g., a flow transmitter) connected to the flow sensor 200. The alternating current causes the magnet corresponding to the coil to be attracted and repelled, thereby driving the flow tubes 210 to move towards and away from each another.

The electromagnetic assembly 230 also detects changes in the vibration of the flow tubes 210 due to the flow of the fluid and outputs electrical signals that can be used to measure flow rate and density of the fluid. When the fluid flows through the flow tubes 210, Coriolis forces produce a twisting vibration of the flow tubes 210, which results in a phase shift. As the magnets and coils are mounted on the flow tubes, the phase shift can be captured by the magnets and coils, e.g., represented by electrical signals of the coils and be used to determine a mass flow rate of the fluid.

The density of the fluid relates to the resonant frequency of the flow tubes 210. The density of the fluids can thereby be determined by monitoring the change in the resonant frequency of the flow tubes 210. The resonant frequency of the flow tubes 210 depends at least on the density of the fluid present in the flow tubes 210 and the density of a material of the flow tubes 210.

The inlet flow path assembly provides a flow path for the fluid to flow into the flow tubes 210. The inlet flow path assembly includes a Y block 242A, a Y block adapter 244A, a tubing elbow 246A, a barb adapter 248A, and a hose barb 249A. The Y block 242A includes a top/inlet port on one side and two bottom/outlet ports on the other side. It is formed with an internal channel that connects the top port to the two bottom ports. The outlet ports of the Y block 242A are assembled and bonded onto the inlet tubular legs of the flow tubes 210. The inlet port the Y block 242A is bonded to the Y block adapter 244A, which is bonded to one end of the tubing elbow 246A. The tubing elbow 246A forms an angle that is greater than 90° and provides a sweep turn to the fluid. Compared with a 90° turn, the fluid encounters a lower shear force when it flows through the tubing elbow 246A, which protects matters in the fluid from being damaged or destructively impacted. The matters in the fluid can be organic matters, such as live cells, protein, virus, bacteria, etc. The other end of the tubing elbow 246A is connected to the barb adapter 248A, which is also connected to the hose barb 249A. The hose barb 249A can be connected to a hose as required by the user when the user installs the flow sensor 200. More details about Y block and hose barb are described below in conjunction with FIGS. 8-10.

The outlet flow path assembly provides a flow path for the fluid to flow out from the flow tubes 210. Similar to the inlet flow path assembly, the outlet flow path assembly includes a Y block 242B, a Y block adapter 244B, a tubing elbow 246B, a barb adapter 248B, and a hose barb 249B, which are connected similarly as the components of the inlet flow path assembly described above. The hose barb 249B can be connected to another hose as required by the user when the user installs the flow sensor 200.

The hose barbs 249A and 249B are aligned in a straight line, as illustrated by the dashed line in FIG. 2. Such an alignment is desirable for installing the flow sensor 200 into a system (e.g., a process skid) having a flow path arranged in a straight line. It is easier to install and plumb the flow sensor 200 in such a flow path. In other embodiments, the inlet and outlet flow path assemblies can have different components and different alignments for fitting in different flow paths.

The components of the inlet and outlet flow path assemblies can be made from a polymer (such as PEEK) by various processes, such as machining, extruding, injection molding, bending, etc. The components can be bonded together by using a glue, such as epoxy resin. These components and the glue can be sterilized by using Gamma irradiation, e.g., they are compliant for Class VI Gamma sterilization up to 50 kGy.

In some embodiment, the flow sensor 200 may have inlet and outlet flow path assemblies different from these in FIG. 2. For instance, each flow path assembly has an end block, a barb adapter, and a hose barb. The end block connects the flow tubes 210 to another flow device (such as a hose, tubing, or other types of plumbing). A channel is formed inside the end block to allow the fluid to flow through it. The channel defines a flow path of the fluid inside the end block. The flow path of the fluid inside the end block has no right angle (90°) turns to avoid high shear force exerted on the fluid. The barb adapter may be similar to the barb adapter 248A or 248B and can be glued on an inner surface of the end block. The hose barb can be similar to the hose barb 249A or 249B. The end block, barb adapter, and hose barb may form a straight line.

The electronic assembly facilitates storage and transmission of data associated with the flow sensor 200. The electronic assembly includes a printed circuit board (PCB) 253, at least one memory chip (not shown in FIG. 2) mounted on the PCB 253, an interface cable 255 connected to the PCB 253, and an interface connector 257 connected to or assembled on the PCB 253.

The PCB 253 provides structural support for components mounted on it, such as the memory chip. The memory chip stores calibration information of the flow sensor 200. The calibration information can be used to adjust a flow rate or density measured by the flow sensor 200. In some embodiments, the calibration information includes a plurality of calibration factors. Each calibration factor is for adjusting a flow rate, such as a low flow rate (e.g., about 1 liter/minute), medium flow rate (e.g., about 10 liter/minute), or high flow rate (e.g., from 20 liter/minute to 200 liter/minute). The calibration information can be read out from the memory chip, e.g., by a flow transmitter, through the interface connector 257.

The interface cable 255 connects the coils to the PCB 253. In FIG. 2, the interface cable 255 is also assembled onto the PCB 253 that provides structural support to the interface cable 255. More details about the electronic assembly are described below in conjunction with FIG. 7.

The enclosure assembly encloses the flow tube 210, the support 220, the electromagnetic assembly 230, and the electronic assembly and provides structural support to them. The enclosure assembly, shown in cut away in FIG. 2, includes an enclosure cup 260 and an enclosure lid 265. The enclosure lid 265 can be mounted on the enclosure cup 260, e.g., through bolts. In some embodiments, the enclosure assembly is made of a polymer material, e.g., polycarbonate or PEEK.

The flow tubes 210 and the support 220 can be integrated and disposed as one piece. For instance, the flow tubes 210 are removably mounted on the electromagnetic assembly 230 and the support 220 are removably mounted on the enclosure lid 265, e.g., through mounting tabs and bolts. This way, the flow tubes 210 and the support 220 can be removed from the electromagnetic assembly 230 and enclosure assembly, and new flow tubes and a new support can be mounted on the electromagnetic assembly 230 and enclosure assembly. In some embodiments, the flow tubes 210, the support 220, and the electromagnetic assembly 230 are integrated to be one piece and they can be disposed as one piece when needed. This design is suitable for disposable applications, such as applications where flow sensors need to be disposed to avoid contamination from fluids used in a previous process batch. With such a design, the flow tubes 210 and the support 220 can be disposed as one piece, e.g., after single use, and the other components of the flow sensor 200 can be reused. Compared with disposing the whole flow sensor 200, this is more environmentally friendly and cost efficient.

Figure 3:
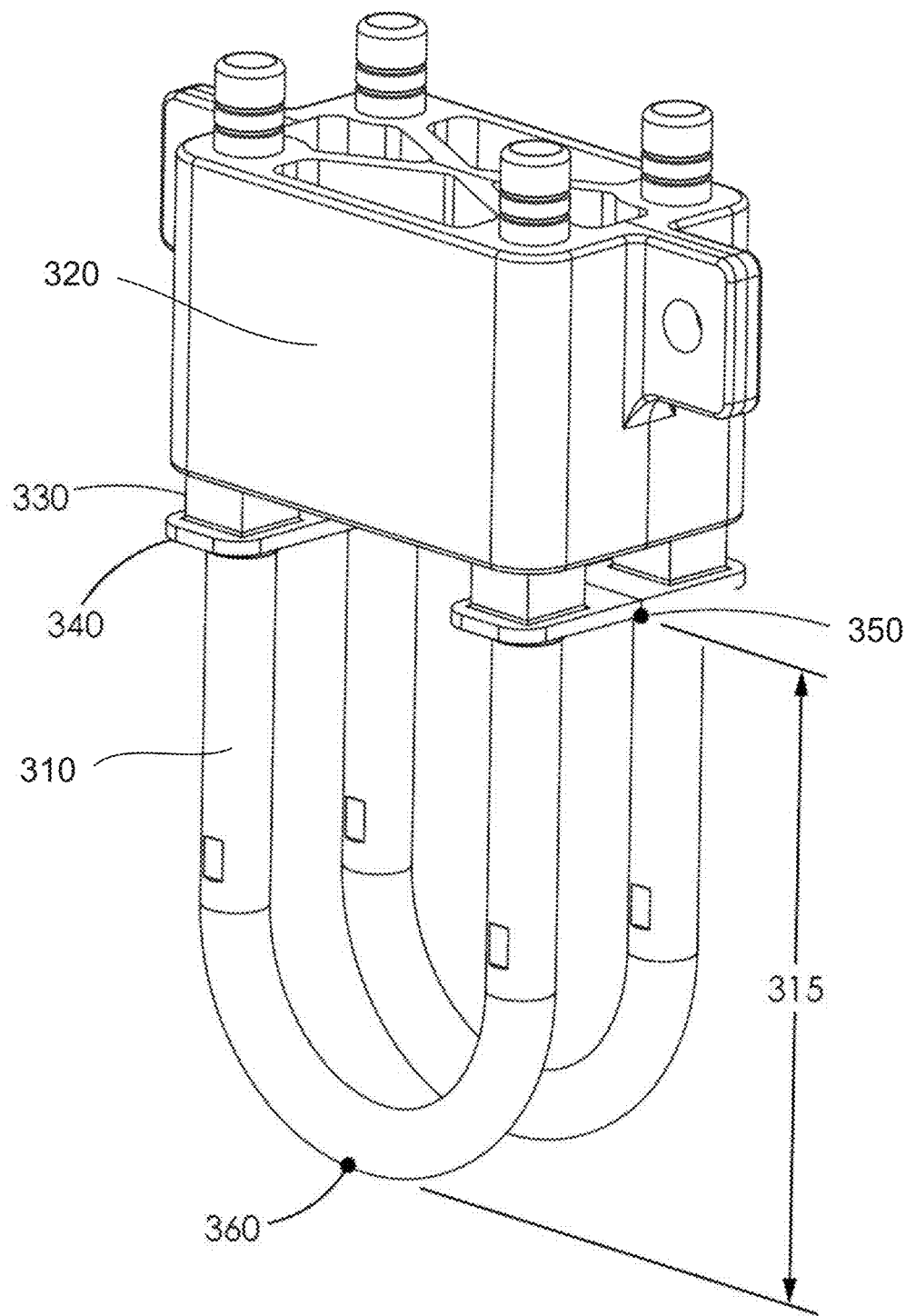
FIG. 3 illustrates a tube length of U-shape flow tubes, in accordance with an embodiment.

FIG. 3 illustrates a tube length 315 of U-shape flow tubes 310, in accordance with an embodiment. The flow tubes 310 (individually referred to as "flow tube 310") are identical, and they can be an embodiment of the flow tubes 119 in FIG. 1. Each flow tube 310 includes two parallel tubular legs that are clamped by a support 320. The support 320 includes port extensions 330 (individually referred to as "port extension 330") and isolation plates 340 (individually referred to as "isolation plate 340"). Each tubular leg contacts an isolation plate 340 of the support 320 at a contact point 350. The tube length 315 of the flow tubes 310 is a vertical distance from the tip 360 of the U to the contact point 350.

The tube length 315 affects the resonant frequency of the flow tubes 310. Flow sensors within a single flow measurement system can have flow tubes of different tube lengths to mitigate cross-talk between the flow sensors. The tube length difference between two flow sensors can be 0.5 mm or more. In some embodiments, the maximum tube length difference between any two flow sensors relates to the number of flow sensors in the flow measurement system and a tube length design tolerance of individual flow sensors. For instance, in an embodiment where the tube length design tolerance requires the tube length of an individual flow sensor to be in a range from 100 mm to 150 mm and the flow measurement system includes 11 flow sensors, the maximum tube length difference is 5 mm.

Figure 4:
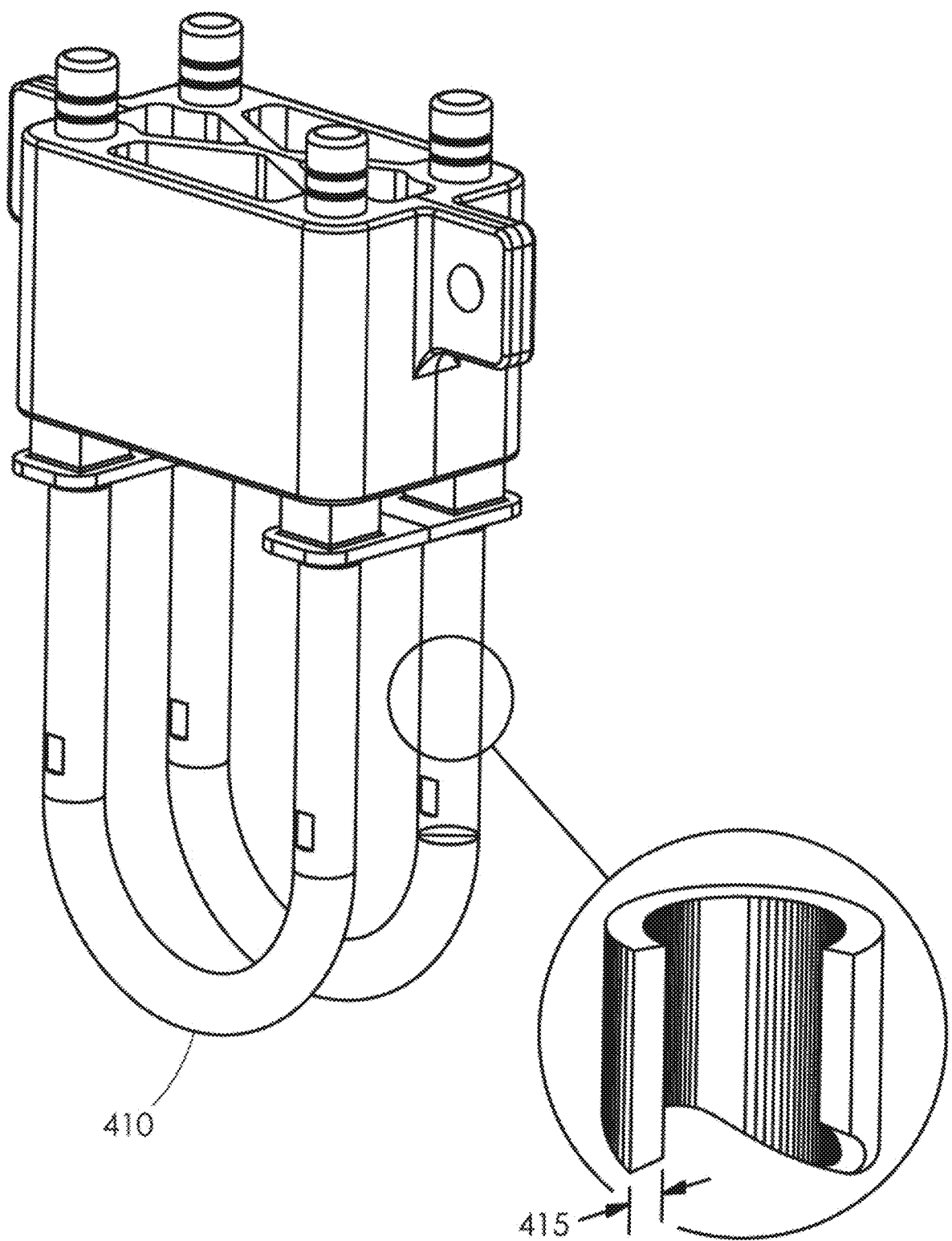
FIG. 4 illustrates a wall thickness of U-shaped flow tubes, in accordance with an embodiment.

FIG. 4 illustrates a wall thickness 415 of U-shaped flow tubes 410, in accordance with an embodiment. The flow tubes 410 can be identical and can be an embodiment of the flow tubes 119 in FIG. 1. Each flow tube 410 is in a form of a tube. The wall thickness 415 is the thickness of the tube wall, e.g., the difference between the inner radius of the tube and the outer radius of the tube.

The wall thickness 415 affects the resonant frequency of the flow tubes 410. Flow sensors within a single flow measurement system can have flow tubes of different wall thicknesses to mitigate cross-talk between the flow sensors. The wall thickness difference between two flow sensors can be 0.1 mm or more. In some embodiments, the maximum wall thickness difference between any two flow sensors relates to the number of flow sensors in the flow measurement system, a design tolerance for the flow tube outer diameter (e.g., the maximum threshold for the flow tube outer diameter), and a design tolerance for the flow tube inner diameter (e.g., the minimum threshold for the flow tube inner diameter).

Figure 5:
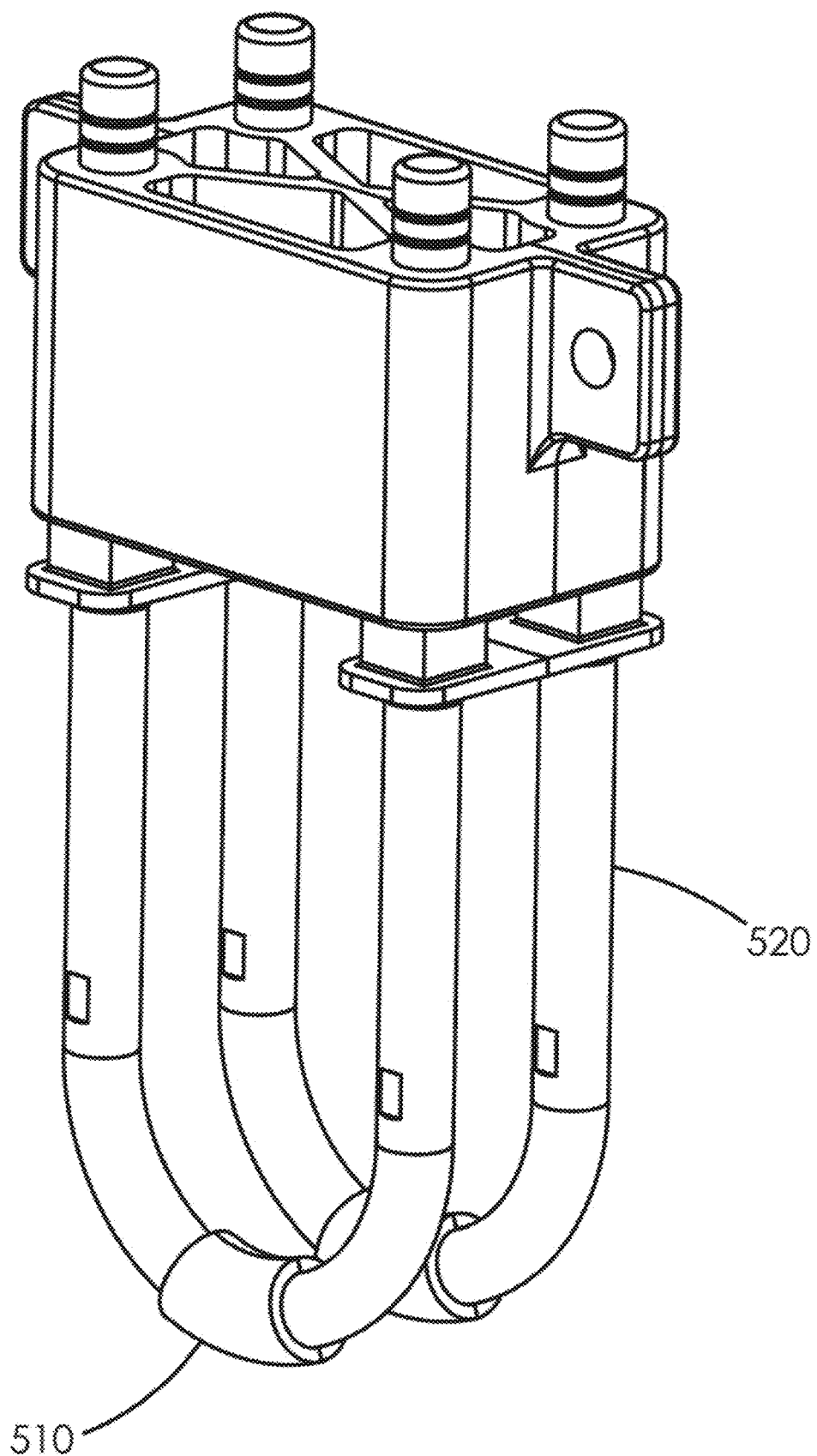
FIG. 5 illustrates attachments mounted on U-shaped flow tubes, in accordance with an embodiment.

FIG. 5 illustrates attachments 510 mounted on U-shaped flow tubes 520, in accordance with an embodiment. The two flow tubes 520 are identical, and the two attachments 510 are identical. Each of the attachments 510 (individually referred to as attachment 510) is mounted on one of the flow tubes 520 (individually referred to as flow tube 520) to add weight on the flow tube 520. With the add-on weight, the flow tubes 510 can have a different resonant frequency due to the change in weight. In the embodiment of FIG. 5, the attachment 510 is in a form of a short tube that encloses a portion of the flow tube 520 including the bottom of the U. The inner diameter of the attachment 510 is the same as or slightly larger than the outer diameter of the flow tube 520. In other embodiments, the attachment 510 can be in other forms, such as a piece attached on the bottom of the U, etc. The attachment 510 may be mounted at different positions on the flow tube 520.

In some embodiments, the weight of the attachment 510 is at least 0.1 gram, e.g., in a range from 0.1 gram to 1 gram. In a flow measurement system containing multiple flow sensors, one of the flow sensors may have no attachment mounted on it and the other flow sensors may have attachments of different weights so that all the flow sensors have different weights and different resonant frequencies from each other. Taking the flow measurement system 100 in FIG. 1 for example, in one embodiment, the flow sensor 110 includes no attachment mounted on its flow tubes 119, but the flow sensor 120 includes the attachments 510, and the flow sensor 130 includes attachments heavier than the attachments 510. The weight difference between any two of the flow sensors 110, 120, and 130 can be at least 0.1 gram so that the flow sensors 110, 120, and 130 have different resonant frequencies from each other.

Figure 6A:
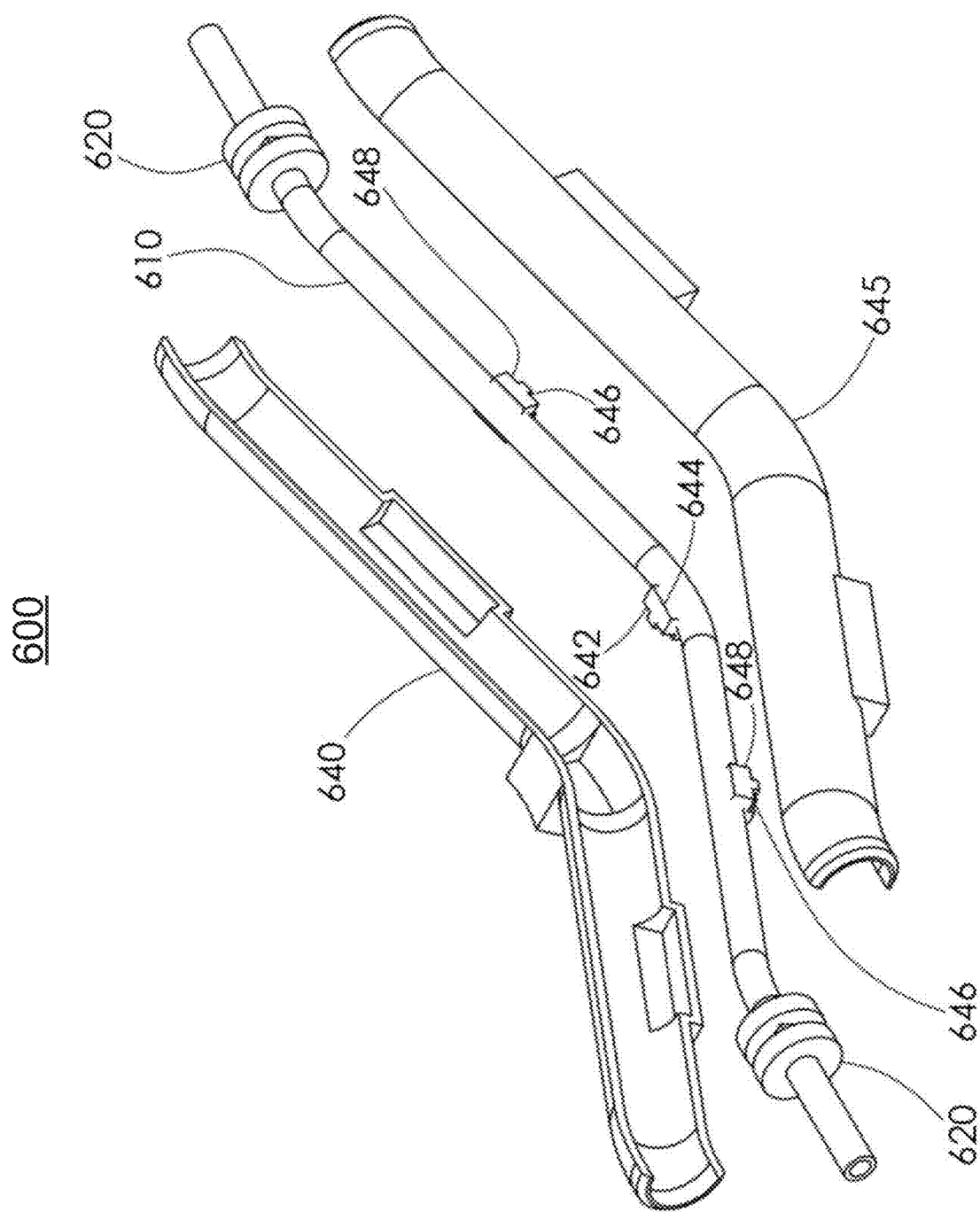
FIG. 6A illustrates a flow sensor including a V-shaped flow tube, in accordance with an embodiment.
Figure 6B:
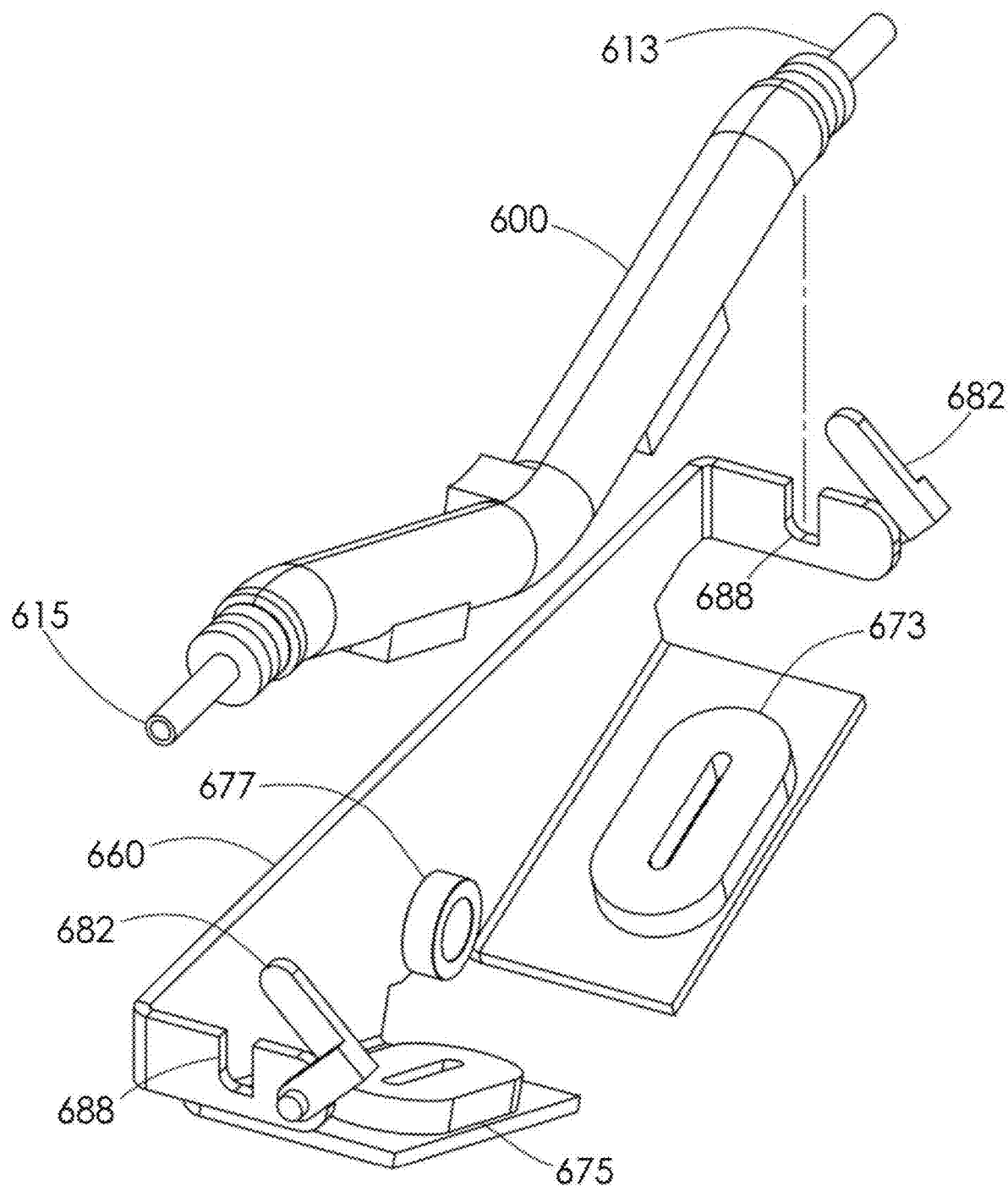
FIG. 6B illustrates a flow sensor system including the flow sensor, in accordance with an embodiment.

FIG. 6A illustrates a flow sensor 600 including a V-shaped flow tube 610, in accordance with an embodiment. The flow sensor 600 also includes two supports 620 (individually referred as "support 620"), a magnet assembly, and an enclosure. FIG. 6B illustrates a flow sensor system 650 including the flow sensor 600, in accordance with an embodiment. The flow sensor system 650 also includes a cradle 660 where the flow sensor 600 can be mounted.

The cradle can be made of stainless steel. The cradle 660 maintains a position of the flow sensor 600 and prevents impact of external vibration on the flow sensor 600. The cradle can be made of metal, e.g., stainless steel. The cradle 660 includes a coil assembly, which includes sense coils 673 and 675 and a drive coil 677, and a locking assembly, which includes two latches 682 and two grooves 688.

The flow tube 610 has a V shape. It includes two ports 613 and 615 at opposite ends. A fluid can enter the flow tube from one of the two ports 613 and 615 and exit from the other port. The fluid encounters a smaller pressure drop in the V-shaped flow tube 610, compared with a U-shaped flow tube. The flow tube 610 has a thin wall and small inner diameter. The thickness of the wall can be less than 1 mm, e.g., in a range from 0.05 mm to 0.60 mm. The inner diameter of the flow tube 610 can be 0.10 mm to 0.81 mm. Such dimensions make the flow tube 610 suitable for measuring low flow rates, e.g., flow rates from 0.05 gm/min to 0.5 gm/min. Also, the flow rate turndown of the flow sensor 600 (i.e., the operation range of the flow sensor) can exceed 120:1, which is better than typical flow rate turndowns.

As shown in FIG. 6B, each of the two ports 613 and 615 can be locked in a groove 688 of the locking assembly of the cradle by using a latch 682. The locking assembly can prevent the flow tube 610 from rotating. In some embodiments, the flow tube 610 is fabricated by extruding a polymer (e.g., PEEK) to form a straight tube and then bending the tube into the desired V-shape.

The two supports 620 in FIG. 6A provides structural support to the flow tube 610. Each support 620 has a form of a ring. Each support 620 clamps the flow tube 610, and the flow tube 610 extends through the two supports 620. The supports 620 can be fabricated by casting around the flow tube 610. Other fabrication techniques, e.g., injection molding, cannot form the supports 620 without deforming the flow tube 610. In some embodiments, the supports 620 are identical.

The magnet assembly includes a drive magnet 642, a drive magnet mount 644, two sense magnets 646, and two sense magnet mounts 648. The drive magnet 642 is glued onto the drive magnet mount 644, and the sense magnets 646 are glued to the sense magnet mounts 648, e.g., by using Loctite M-31CL epoxy. The drive magnet mount 644 and sense magnet mounts 648 are attached on the flow tube 610. The drive magnet 642 couples with a drive coil 677 of the coil assembly in the cradle 660 for driving the flow tube 610 to vibrate, e.g., at a fixed resonant frequency. The sense magnets 646 couple with sense coils 673 and 675 shown in FIG. 6B to generate two electrical signals indicating change in the vibration of the flow tube 610 due to Coriolis forces and the phase shift between the two electrical signals which corresponds to the mass fluid flow rate through the flow tube(s) 610.

The enclosure includes two halves 640 and 645. It encloses a portion of the flow tube 610, e.g., the portion between the supports 620, and the magnet assembly. In some embodiments, the flow tube 610, the supports 620, and the magnet assembly (or the flow tube 610 and the supports 620) are integrated. For instance, they can be inserted into or removed from the enclosure as one piece. They can also be disposed as one piece after single use. In some embodiments, the flow sensor 600 itself, including the enclosure, can be installed on or removed from the cradle 660 as one piece and be disposed after single use.

Figure 7:
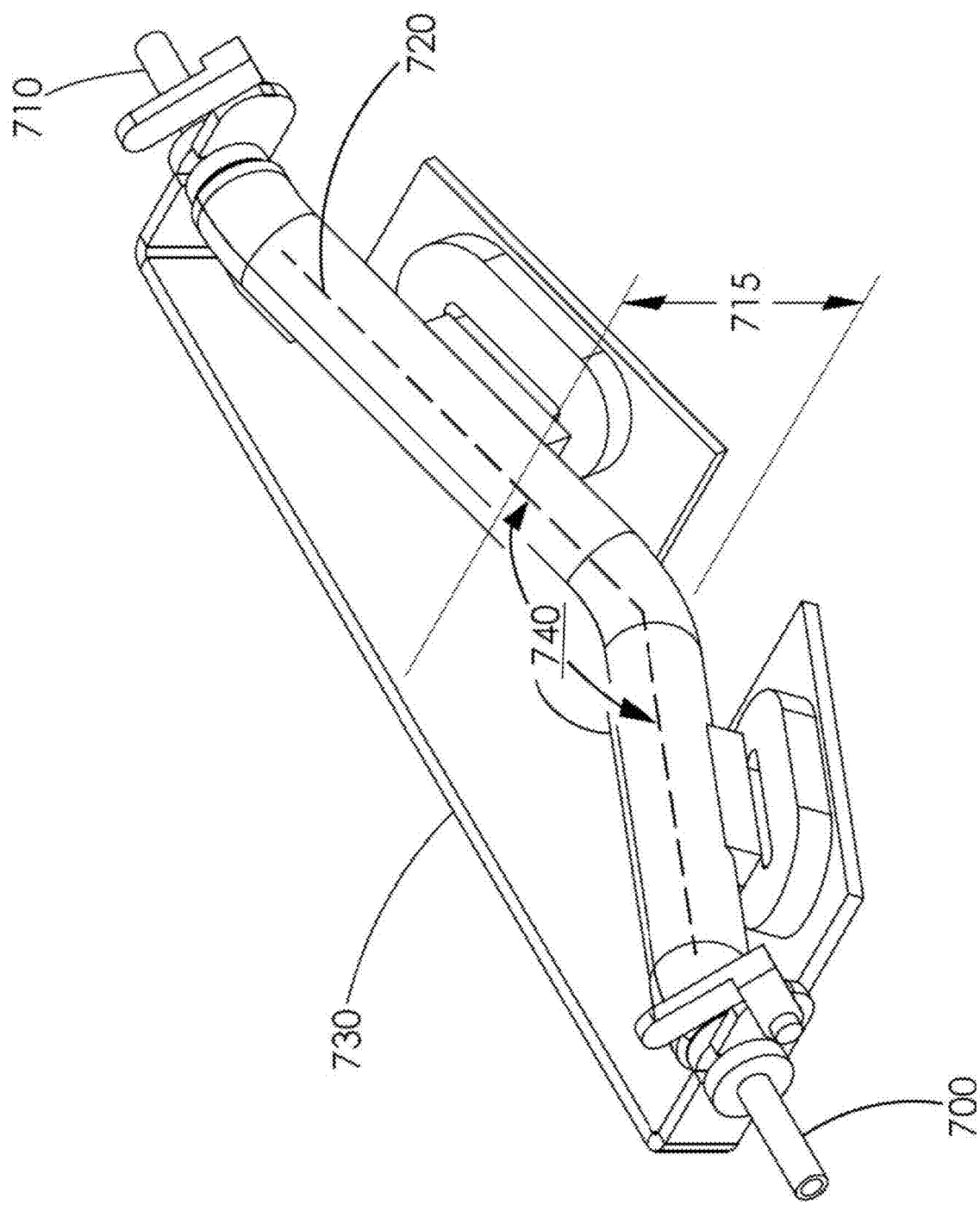
FIG. 7 illustrates a tube length of a flow sensor including a V-shape flow tube, in accordance with an embodiment.

FIG. 7 illustrates a tube length 715 of a flow sensor 700 including a V-shape flow tube 710, in accordance with an embodiment. An embodiment of the flow sensor 700 is the flow sensor 600 in FIG. 6. Part of the flow tube 710 is enclosed in a V-shaped enclosure 720. The flow sensor 700 is mounted on a cradle 730. The tube length 715 is a distance from the bottom of the enclosure 720 to the top of the cradle 730 in the Y direction.

The tube length 715 affects the resonant frequency of the flow sensor 700. Flow sensors that operate within a single flow measurement system can have flow tubes of different tube lengths to mitigate cross-talk between the flow sensors. The tube length difference between two flow sensors can be 0.5 mm or more. In some embodiments, the maximum tube length difference between any two flow sensors is determined by the number of flow sensors in the flow measurement system and a tube length design tolerance of individual flow sensors. For instance, in an embodiment where the tube length design tolerance design tolerance requires the tube length of an individual flow sensor to be in a range from 100 mm to 150 mm and the flow measurement system includes 11 flow sensors, the maximum tube length difference is 5 mm.

The tube length 715 can be determined based on an angle 740 of the V. V-shape flow sensors having different tube lengths may have different angles. For instance, a V-shape flow sensor having a larger tube length has a smaller angle compared with a V-shape flow sensor having a smaller tube length.

Figure 8:
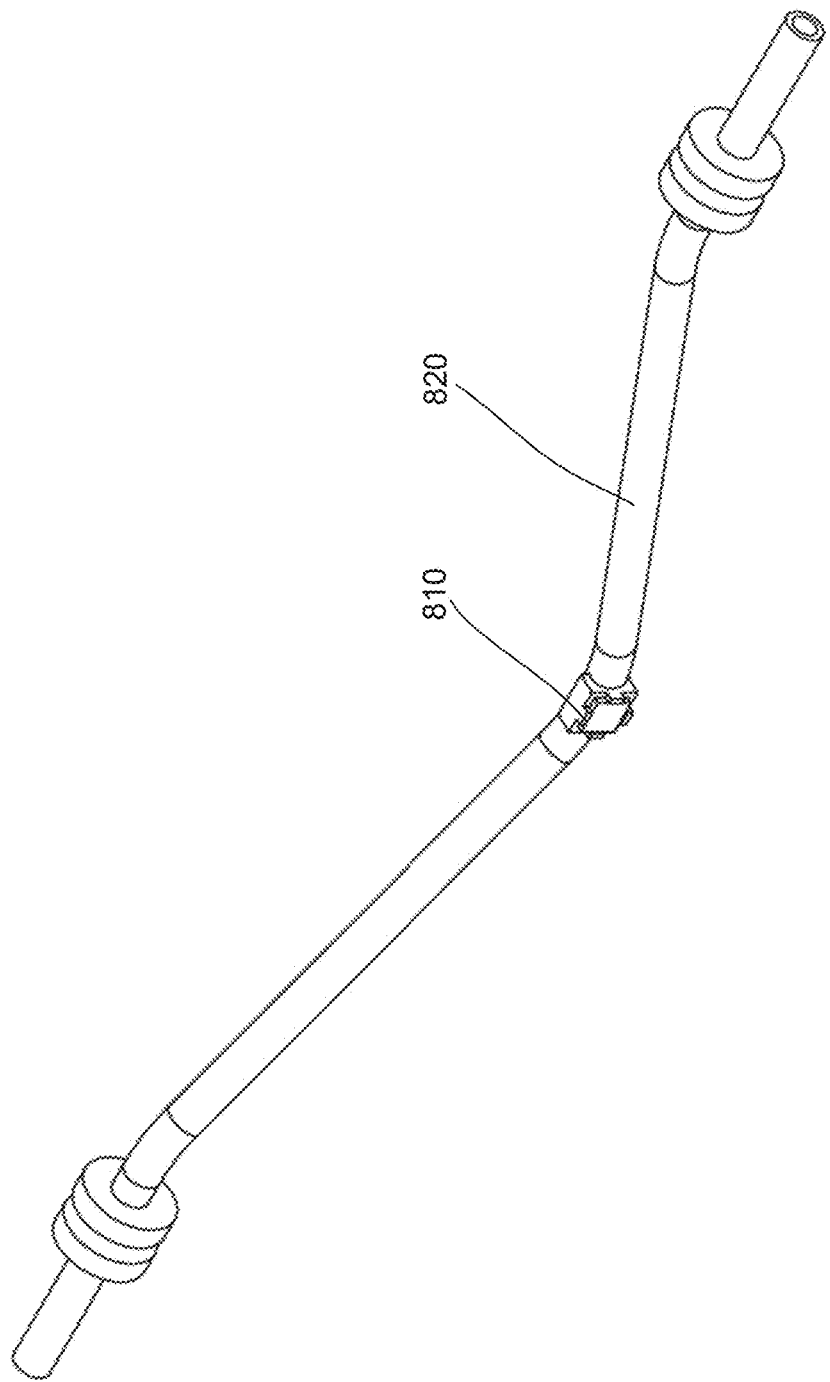
FIG. 8 illustrates an attachment mounted on a V-shaped flow tube, in accordance with an embodiment.

FIG. 8 illustrates an attachment 810 mounted on a V-shaped flow tube 820, in accordance with an embodiment. The attachment 810 adds weight on the flow tube 820. With the add-on weight, the flow tube 820 can have a different resonant frequency due to the change in weight. In the embodiment of FIG. 8, the attachment 810 is in a form of a rectangular piece that clamps the tip of the V. In other embodiments, the attachment 810 can be in other forms, such as a short V-shape tube that encloses a portion of the flow tube 820. The attachment 810 may be mounted at different position on the flow tube 820.

In some embodiments, the weight of the attachment 810 is at least 0.1 gram, e.g., in a range from 0.1 gram to 1 gram. In a flow measurement system containing multiple flow sensors, one of the flow sensors may have no attachment mounted on it, another flow sensor may have the attachment 810 mounted on it, and yet another flow sensor may have an attachment heavier than the attachment 810.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A process skid comprising:
   a mixing manifold;
   a first flow path connected to the mixing manifold, and a first pump and a first Coriolis flow sensor positioned along the first flow path, wherein a first fluid flows through the first pump and the first Coriolis flow sensor and into the mixing manifold;
   a second flow path connected to the mixing manifold, and a second pump and a second Coriolis flow sensor positioned along the second flow path, wherein a second fluid flows through the second pump and the second Coriolis flow sensor and into the mixing manifold; and
   a third flow path connected to the mixing manifold, wherein a third fluid flows out of the mixing manifold, the third fluid comprising a mixture of the first and second fluids;
   wherein the first Coriolis flow sensor and the second Coriolis flow sensor have different resonant frequencies.

2. The process skid of claim 1 wherein the process skid is a biopharmaceutical or pharmaceutical skid.

3. The process skid of claim 1 wherein the first and second Coriolis flow sensors are sterilizable by gamma irradiation.

4. The process skid of claim 3 wherein each of the first and second Coriolis flow sensors comprises at least one flow tube and an enclosure that encloses the flow tube, and the Coriolis flow sensors are sterilizable by gamma irradiation through the enclosure.

5. The process skid of claim 3 wherein each of the first and second Coriolis flow sensors comprises at least one stainless steel flow tube and a plastic enclosure that encloses the flow tube.

6. The process skid of claim 3 wherein each of the first and second Coriolis flow sensors comprises at least one flow tube and an enclosure that encloses the flow tube, and the flow tube and enclosure are integrated and disposable as a single piece.

7. The process skid of claim 1 further comprising:
   a third Coriolis flow sensor positioned along the third flow path, wherein the first and second Coriolis flow sensors are closer to each other than to the third Coriolis flow sensor.

8. The process skid of claim 1 wherein the first and second flow paths are parallel to each other.

9. The process skid of claim 1 wherein the first Coriolis flow sensor comprises a first flow tube and the second Coriolis flow sensor comprises a second flow tube, and a length of the second flow tube is different from a corresponding length of the first flow tube, whereby a resonant frequency of the second flow tube is different from a resonant frequency of the first flow tube.

10. The process skid of claim 9 wherein a difference between the length of the second flow tube and the corresponding length of the first flow tube is at least 0.5 mm.

11. The process skid of claim 1 wherein the first Coriolis flow sensor comprises a first flow tube and the second Coriolis flow sensor comprises a second flow tube, and a material of the second flow tube is different from a material of the first flow tube, whereby a resonant frequency of the second flow tube is different from a resonant frequency of the first flow tube.

12. The process skid of claim 1 wherein the first Coriolis flow sensor comprises a first flow tube and the second Coriolis flow sensor comprises a second flow tube, and a thickness of a wall of the second flow tube is different from a thickness of a corresponding wall of the first flow tube, whereby a resonant frequency of the second flow tube is different from a resonant frequency of the first flow tube.

13. The process skid of claim 12 wherein a difference between the thickness of the wall of the second flow tube and the thickness of the corresponding wall of the first flow tube is at least 0.1 mm.

14. The process skid of claim 1 wherein the first Coriolis flow sensor comprises a first flow tube and the second Coriolis flow sensor comprises a second flow tube, and an attachment is mounted on the second flow tube but not on the first flow tube, such that a weight of the second flow tube plus attachment is different from a weight of the first flow tube without attachment, whereby a resonant frequency of the second flow tube is different from a resonant frequency of the first flow tube.

15. The process skid of claim 14 wherein a weight of the attachment is at least 0.1 gram.

16. A process skid comprising:
a mixing manifold;
a first flow path connected to the mixing manifold, and a first pump and a first Coriolis flow sensor positioned along the first flow path, wherein a first fluid flows through the first pump and the first Coriolis flow sensor and into the mixing manifold;
a second flow path connected to the mixing manifold, and a second pump and a second Coriolis flow sensor positioned along the second flow path, wherein a second fluid flows through the second pump and the second Coriolis flow sensor and into the mixing manifold;
a third flow path connected to the mixing manifold, wherein a third fluid flows out of the mixing manifold, the third fluid comprising a mixture of the first and second fluids; and
a first cradle and a second cradle, wherein the first and second Coriolis flow sensors are disposable and are installed on and then removed from the first and second cradles after a single use,
wherein the first Coriolis flow sensor and the second Coriolis flow sensor have different resonant frequencies.

17. The process skid of claim 16 wherein the first and second Coriolis flow sensors are sterilizable by gamma irradiation.

18. The process skid of claim 17 wherein each of the first and second Coriolis flow sensors comprises at least one flow tube and an enclosure that encloses the flow tube, and the Coriolis flow sensors are sterilizable by gamma irradiation through the enclosure.

19. The process skid of claim 17 wherein each of the first and second Coriolis flow sensors comprises at least one stainless steel flow tube and a plastic enclosure that encloses the flow tube.

20. The process skid of claim 16 wherein each of the first and second Coriolis flow sensors comprises at least one flow tube and an enclosure that encloses the flow tube, and the flow tube and enclosure are integrated and disposable as a single piece.

* * * * *